June 2, 1964     J. O. BROWN     3,135,115
COMPENSATED INTEGRATOR
Filed March 9, 1959     3 Sheets-Sheet 1

INVENTOR.
JAMES O. BROWN
BY *Arthur L. Wade*
ATTORNEY

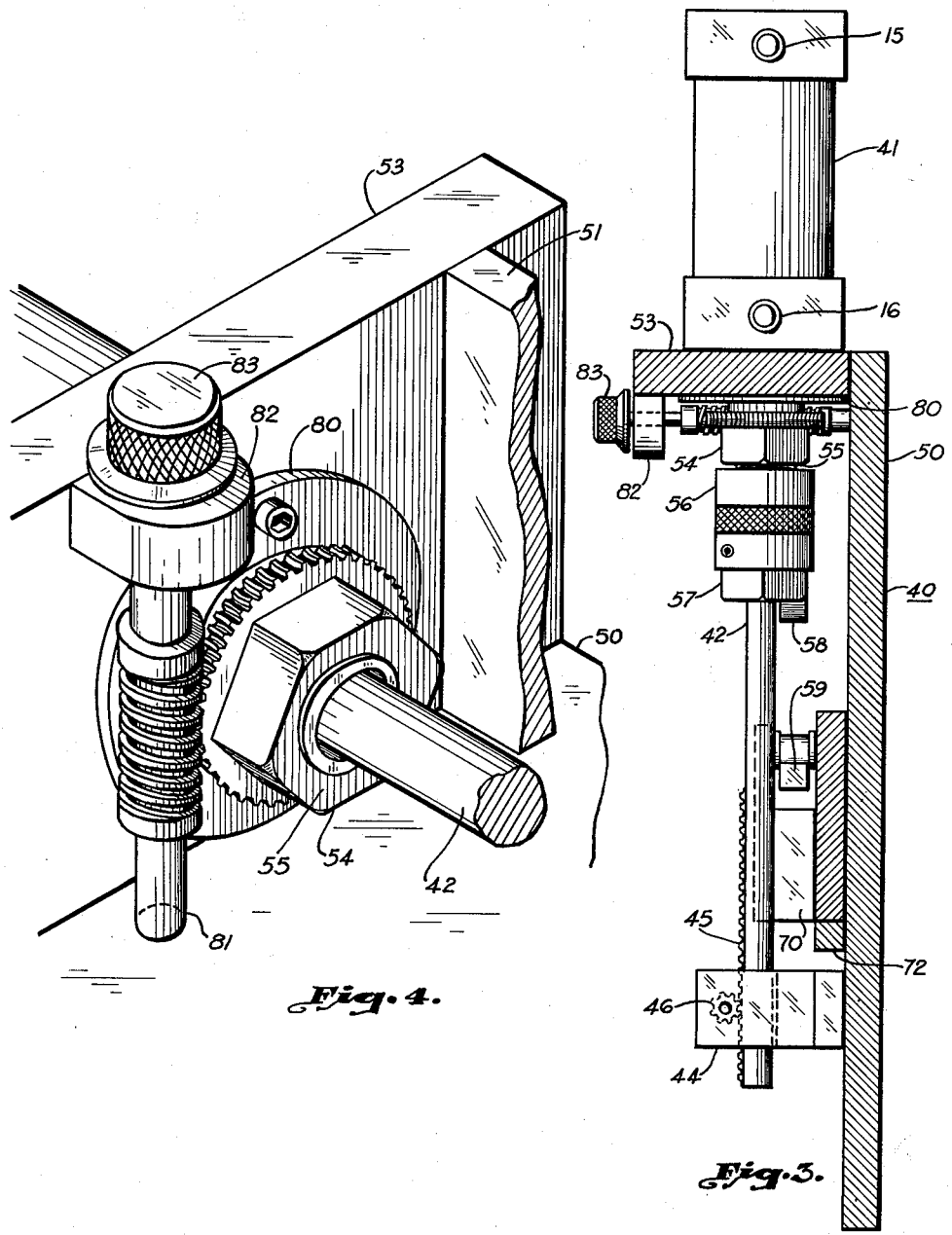

United States Patent Office 3,135,115
Patented June 2, 1964

---

3,135,115
COMPENSATED INTEGRATOR
James O. Brown, Tulsa, Okla., assignor to National Tank
Company, Tulsa, Okla., a corporation of Nevada
Filed Mar. 9, 1959, Ser. No. 798,043
5 Claims. (Cl. 73—223)

The invention relates to integrating devices for volume measuring meters. More specifically, the invention relates to ways of compensating the integrating devices with a variable which changes the volume of the material metered.

The various fluids produced by an oil well are usually separated in proximity to the wellhead and fed to a gathering system of pipelines. Customarily, the liquid hydrocarbon portion of the fluids have been stored in tanks and manually gauged as part of the procedure whereby the owner of the pipeline accepts the oil taken into the pipeline from the tanks.

Recently, various systems have been developed for automatically measuring the oil in saleable condition and promptly delivering it to the pipeline. These lease automatic custody transfer systems generally include, as an essential function, the filling and emptying of a container between predetermined levels. The result is that the volume of the tank, or container, filled with oil between these levels, becomes the measure of the total quantity passed to the pipeline if provision is made to totalize, or integrate, the number of times the tank is filled and dumped.

Some means must be provided for flowing only saleable oil through the transfer system. Then, when saleable oil flows through the system, the variation of its net quantity by several factors must be taken into account when totalizing. Although the percentage of basic sediment and water in the saleable oil may be within acceptable limits, its quantity may still vary over a number of integrated measuring tank readings. More immediately important, the temperature variations of the metered oil spreads the difference between the integrated reading of the number of times the tank is dumped and the net quantity of saleable oil passed through the measuring system. The integrator, or net barrel counter, which exhibits the tank dumps, requires at least continuous adjustment by temperature in order for the readings to form an accurate basis for sales to the pipeline owner. In making the temperature adjustment of the integrator, the specific gravity of the oil must be considered because the effect of temperature change on the oil will vary from gravity to gravity. The present invention provides all these compensations of the integrator to exhibit net barrels of oil transferred.

The present invention is embodied in apparatus which utilizes a form of motive power to reciprocate an object-body in a straight-line path. The motive power is applied through means responding to signals developed when a container, or tank, is filled and emptied with the fluid measured. The compensating variables are caused to fix the length of the straight-line path over which the object-body is reciprocated. The primary object of the invention is to fix the length of the reciprocation path of the object-body by pivoting a stop member having a flat contact surface into substantially normal alignment with the straight-line path, by a compensating variable, so the resulting length of translated path will be a record of the number of net barrels of oil passed through the tank.

Another object is to establish the length of a path between two points proportional to the number of net barrels of saleable oil dumped by a tank and to pivot a body establishing one of the points toward, or away from, the other point in accordance with the temperature variations of the oil dumped as an object-body is reciprocated over the path.

Another object of the invention is to establish the distance between two end points of a path of a reciprocating object in proportion to the net barrels of saleable oil dumped by a tank by pivoting a body by temperature of the oil to establish one of the end points and establishing the pivot point of the pivoted body in accordance with the specific gravity of the oil.

Another object of the invention is to establish the distance between two end points of a path of a reciprocating object in proportion to the net barrels of saleable oil dumped by a tank by pivoting a body by temperature of the oil to establish one of the end points while the other of the end points is being established in accordance with the percent basic sediment and water in the oil.

The present invention contemplates controlling a motive means to reciprocate a piston body in a straight-line path. The piston is halted at two points in the path to fix the length of the path between the points so this path length will be proportional to the net barrels of saleable oil filled and dumped by a tank during the complete cycle of reciprocation. A pivoted lever having a flat contact surface is arranged to intercept the piston at one of the points. The lever is moved about its pivot point by a mechanism responsive to a variable. The path length between the two points is then converted into a register reading which can be interpreted in net barrels of oil dumped by the tank.

The present invention additionally contemplates that the mechanism moving the lever about its pivot point will respond to the temperature of the oil dumped by the tank.

The present invention further contemplates that the pivot point of the lever be shifted laterally of the straight-line path between the two points by mechanism responding to the variation of specific gravity of the oil dumped. The specific gravity of the oil will then become the multiplying factor for the temperature to additionally compensate the register reading in net barrels of oil dumped by the tank.

The invention further contemplates that the other of the two points between which the path length is determined is established by a mechanical stop moved by a mechanism responding to the percent of basic sediment and water in the oil dumped. The path length of the piston then becomes still further accurately representative of the net barrels of oil dumped from the tank by reason of the compensation of the gross barrels with the temperature, specific gravity, and the basic sediment and water content.

Other objects, advantages and features of this invention will become more apparent to one skilled in the art upon consideration of the written specification, appended claims, and the attached drawings wherein;

FIG. 3 is a side elevation of the integrator of FIG. 2; and

FIG. 4 is an isometric view of a detail of the integrator of FIG. 2.

Figure 1:
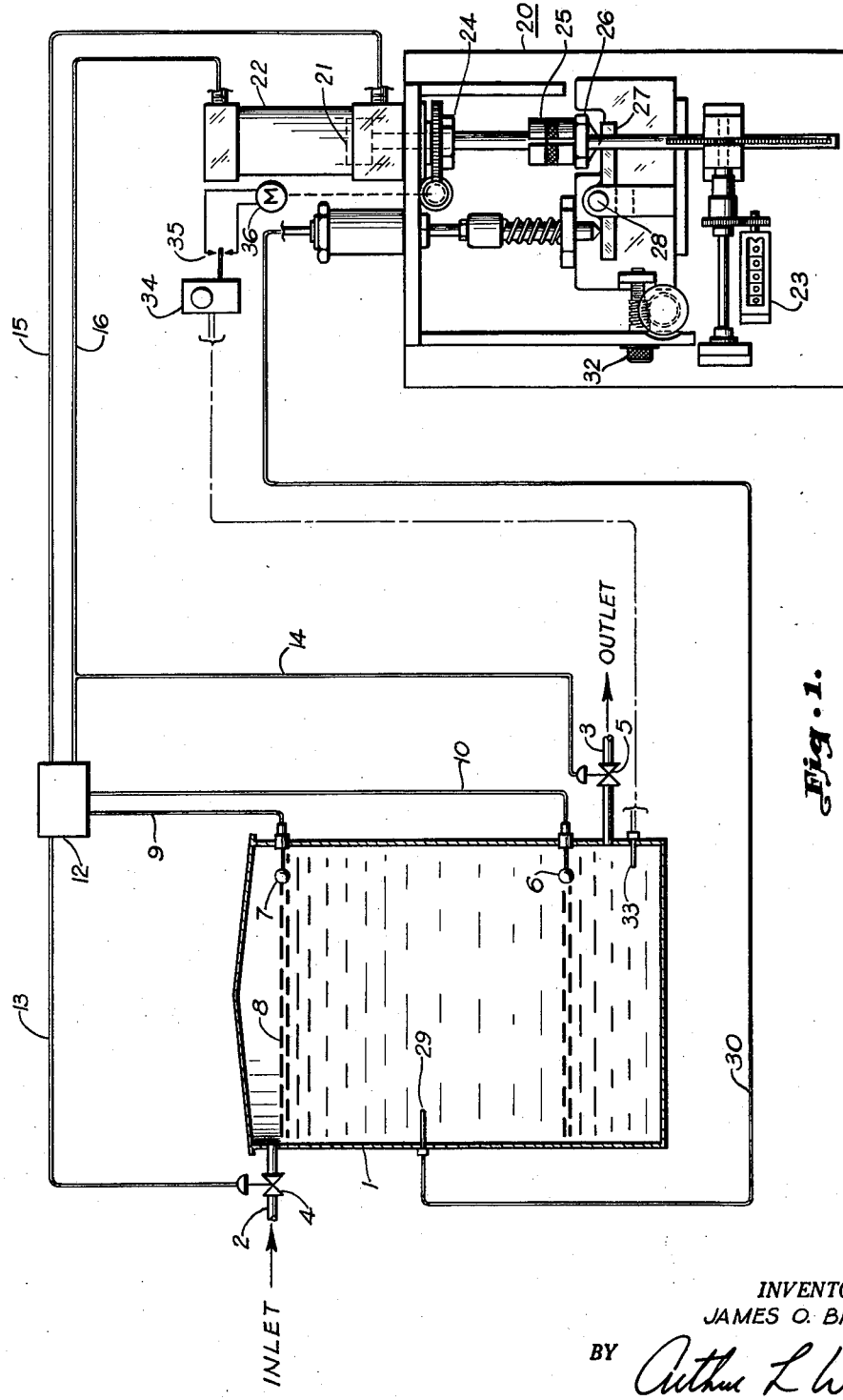
FIG. 1 is a diagrammatic illustration of a lease automatic custody transfer system tank and integrator embodying the present invention.

Referring to FIG. 1, a complete system utilizing an embodiment of the invention is illustrated. As it is an ultimate objective of the invention to accurately determine the number of net barrels of saleable oil passed through a tank, FIG. 1 is used to show a representation of a tank 1 into which oil is passed with conduit 2 and out of which oil is passed with conduit 3. A valve 4 controls the oil supplied tank 1, and a valve 5 controls the oil delivered from tank 1.

To illustrate the metering function of tank 1, a bottom float 6 and top float 7 are shown as they actuate mechanisms which establish fluid pressure signals when the level 8 of the oil raises, or lowers, to each float. Level 8 is shown at float 7. Float 7 causes a fluid pressure signal to be developed in pipe 9 to indicate level 8 has reached float 7. When level 8 is lowered to float 6, the float will cause a fluid pressure signal to be developed in pipe 10 which will indicate that level 8 has reached float 6. As the number of barrels of oil contained within tank 1, between floats 6 and 7, is known from actual measurement, the simple end result is the actuation of a register to accumulate the number of times tank 1 is dumped between the levels at the floats. With the cumulative total of gross barrels accurately compensated by variables representative of the difference between gross barrels and net barrels of saleable oil, the cumulative total becomes an accurately compensated integration which can form an accurate basis for sale of the oil.

The signals of pipes 9 and 10 are utilized to actuate valves 4 and 5 so tank 1 will be alternately supplied and drained between floats 6 and 7. There are many well-known schemes available to accomplish this sequence of control actions. Control instrument 12 represents a location for receiving pipes 9 and 10 and developing output fluid pressures to the valves 4 and 5 in pipes 13 and 14. At the time valves 4 and 5 are controlled by the fluid pressures in pipes 13 and 14 to continuously dump gross barrels of oil from tank 1, pipes 15 and 16 take the fluid pressure signals to an integrating mechanism, or net barrel counter, in which essential elements of the present invention are embodied. Integrator 20 is illustrated as responding to the fluid pressure signals of pipes 15 and 16. Specifically, these fluid pressures are alternately applied to each of the two sides of piston 21, in cylinder 22, of integrator 20.

Piston 21 is broadly conceived of as an object or body reciprocated in a straight-line path by the fluid pressure signals representative of level 8 at it alternately reaches the floats 6 and 7. Each time tank 1 is filled and dumped between the floats, piston 21 is reciprocated along its straight-line path.

Piston 21 is geared to register 23. More specifically, piston 21 and register 23 are geared together through clutches which limit register 23 to turning in one direction through every cycle of reciprocation of piston 21. The basic result of this arrangement is that the reading of register 23 becomes a cumulative total of the barrels of oil dumped by tank 1, between floats 6 and 7.

As stated heretofore, a fundamental objective of the invention is to fix the length of the straight-line path over which object-body, or piston, 21 reciprocates as it actuates register 23. When this path length is fixed between two points established in accordance with the difference between the number of net barrels of oil at a predetermined temperature, and number of gross barrels at that same temperature, register 23 will exhibit a total which can then be described as a compensated integration of the net barrels of oil dumped by metering tank 1. One degree of this compensation is made by temperature as a variable of the difference between net and gross barrels.

The fluid pressure motor, piston 21 and cylinder 22, is not directly regulated to fix the length of straight-line reciprocation. Rather, stop-bodies, or abutments, are provided to engage a protuberance on the shaft of piston 21 to positively limit the piston travel by overcoming the power developed on the piston with the fluid pressure of pipes 15 and 16. Specifically, an adjustable abutting surface is provided at the top of the straight-line path by the surface of nut 24. A shaft collar 25 is fixed to the shaft of piston 21 as the abutment engaging the surface of nut 24 on the up-stroke of piston reciprocation.

On the down-stroke of piston 21, shaft stop collar 26 provides a line-surface on its underside which engages the flat contact surface on one side of rocker arm 27. Rocker arm 27 embodies the conception of a body pivoted at 28. The flat contact side of rocker arm 27 engaged by shaft stop collar 26 is pivoted into substantially normal alignment with the straight-line path of piston 21 by a mechanism responsive to the temperature of the oil in tank 1. The result of pivoting rocker arm 27 in accordance with the temperature variations of the oil in tank 1 is to adjust the bottom point to which piston 21 is limited in reciprocation. This limitation of movement is a modification of the actuation of register 23 by piston 21. The result is compensation of the integration by temperature as one of the more pertinent variables of the difference between net and gross barrels of oil passed through tank 1.

To adjust rocker arm 27 from the temperature of the oil in tank 1, a system is provided which includes a sensing bulb 29. Bulb 29 is part of a closed mercury-filled system utilizing the expansion of mercury to push a plunger through a finite distance which is proportional to the change in temperature to which the bulb 29 is exposed. Bulb 29 is connected, by line 30, to housing 31 which contains the plunger moved by the expansion and contraction of the mercury. The movement of the plunger in housing 31 is transmitted directly to rocker arm 27 so the arm may be pivoted about point 28. A system satisfactory for this purpose is manufactured by The Partlow Corporation, New Hartford, New Jersey.

Pivot point 28 of rocker arm 27 is, itself, shifted in position laterally of the straight-line path of piston 21. FIG. 1 discloses how a gear is rotated with knob 32 to move the bracket on which pivot point 28 is located. Knob 32 is used to rotate a worm gear so that the pivot point 28 will be shifted in accordance with the change in specific gravity of the oil passing through tank 1. Positioning of pivot point 28 introduces the specific gravity of the oil as a multiplying factor for temperature to additional compensate the register 23 reading to make the integration more accurate.

A third factor utilized to further compensate the register reading is the basic sediment and water content of the oil passing through tank 1. A capacitance type probe 33 is mounted in tank 1 at a position where it will sense the change in capacitance due to the change in the percentage of basic sediment and water in the oil of tank 1. The electric signals generated by capacitance probe 33 actuates a circuit in an instrument represented at 34. The electronic circuit in instrument 34, responding to the signals of probe 33, produces a mechanical motion which is used to control switch 35. Switch 35 is in the circuit of a motor 36. A circuit suitable to respond to a capacitance probe and generate a mechanical motion for switch control in disclosed in at least U.S. Patent Gunst et al. 2,720,624, issued October 11, 1955.

Motor 36 is positioned, by actuating of switch 35, to turn a worm gear which positions nut 24 along the straight-line path of piston 21. The surface of nut 24, engaging shaft collar 25, is the second of the points defining the length of the straight-line path of piston 21 which is translated into the reading of register 23. The ultimate result is that the straight-line path between the two points along the path of piston 21 becomes accurately representative of the net barrels of oil dumped from the tank 1 by reason of the compensation of the gross barrels of oil dumped with the temperature, specific gravity and the basic sediment and water content of the oil.

Figure 2:
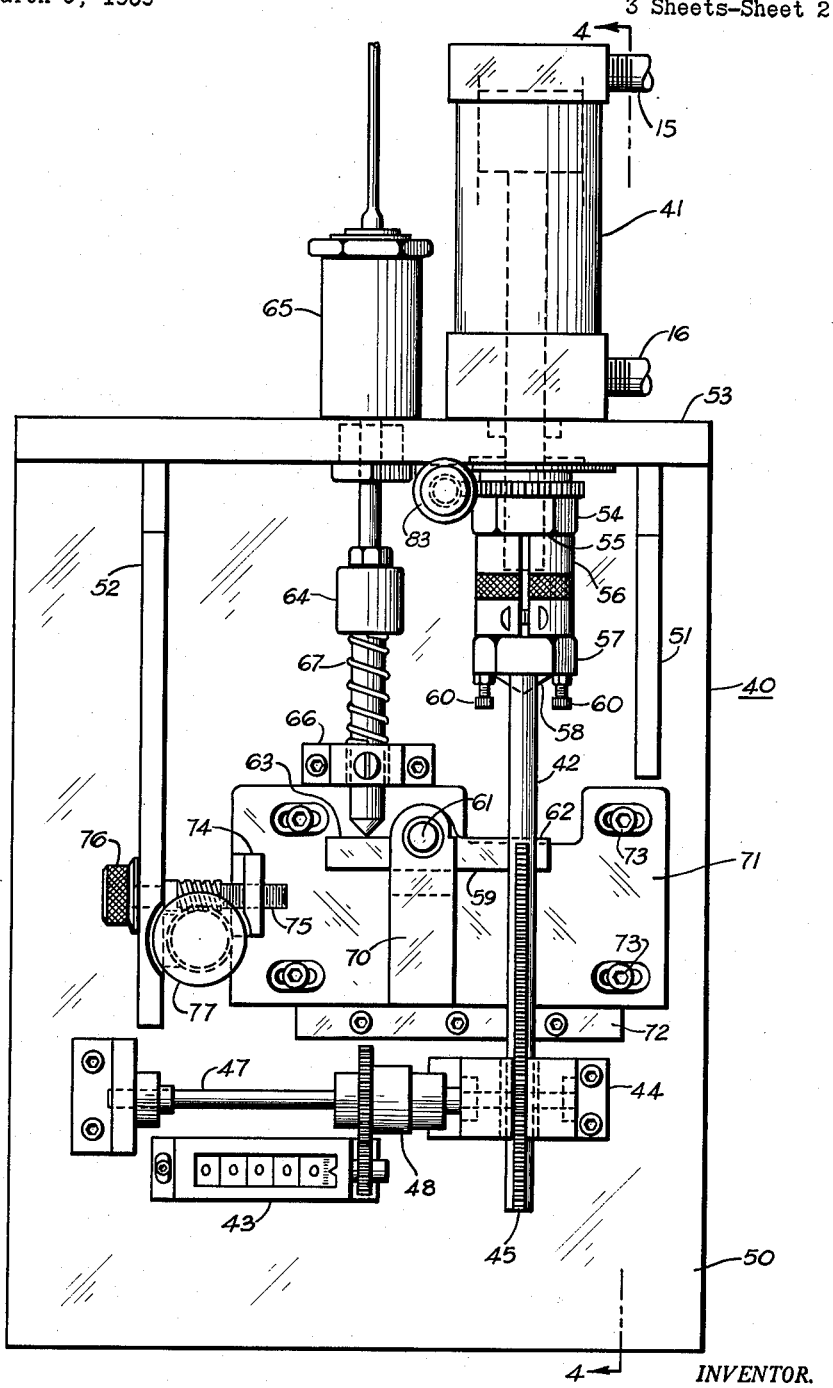
FIG. 2 is a front elevation of an integrator similar to that of FIG. 1.

Referring now to FIG. 2, there is shown an integrator, or net barrel counter, 40 which is similar to the integrator 20 of FIG. 1. The front elevation of FIG. 2 and the partially sectioned side elevation of FIG. 3 should be simultaneously considered. Although integrator 40 is quite similar to integrator 20, it is offered as an additional embodiment for two purposes. First, its piston is shown at its upward limitation in straightline reciprocation. Secondly, the automatic adjustment of the upper point of limitation, illustrated in FIG. 1 is shown as manually established on integrator 40.

Piston cylinder 41 is illustrated as connected to pipes 15 and 16, just as the cylinder of integrator 20 was connected to pipes 15 and 16. The piston within cylinder 41 has a shaft 42 which is reciprocated along the straight-line path translated into a reading of register 43. Piston shaft 42 is journaled through block 44 in order that rack 45 may engage drive pinion 46. The drive pinion shaft is attached to counter-gear shaft 47 through a clutch 48. The arrangement of clutch 48, between the two shafts, is such as to permit the motion of the drive pinion shaft to be transmitted to counter 43 only when they are turned in one direction by rack 45. In this way, the reciprocation of shaft 42 is translated into the cumulative total evidenced by the reading of register 43.

All of the components of integrator 40 are mounted on a solid, substantial, base plate 50. Right side plate 51, left side plate 52 and top mounting plate 53 complete a sturdy framework for the mounting of the various integrator components. Cylinder 41 is mounted solidly on top mounting plate 53 which is, in turn, bolted solidly to base plate 50. Shaft 42 extends downwardly from the piston within cylinder 41. Nut 54 is threaded into a sleeve bolted to the underside of top mounting plate 53. Nut 54 receives shaft 43 slideably therethrough so that its underside surface 55 fixes the point in the straight-line path of piston 42 at which shaft 42 is limited in its upward movement. In order that shaft 42 will, in effect, engage surface 55, a shaft collar 56 is shown as split and bolted to the shaft so that it becomes the abutment on shaft 42 which will contact surface 55.

Directly beneath shaft collar 56 is placed a shaft stop collar 57 which has a wedge-shaped portion 58 extending a line-surface downwardly. Wedge 58 is positioned to engage the upper flat contact surface of rocker arm 59 at the lower point of shaft 42 travel. Shaft stop collar 57 is pinned to shaft 42 and engages shaft collar 56 with stroke adjustment screws 60. The resulting combination is effective abutments on shaft 42 which function in precisely determining the end points of the straight-line reciprocation path which is translated into net barrels of oil passing through measuring tank 1.

Rocker arm 59 has a shaft which determines the line about which it pivots. In FIG. 2 this line appears as a point at 61. Pivoting rocker arm 59 provides a surface 62 as the flat contact surface with which to engage wedge 58 and surface 63 against which a mechanism responsive to the temperature of the oil in tank 1 directly a movable element.

A shaft member 64 is adjusted vertically in position to bear against surface 63. This temperature shaft 64 is an extension of a plunger within housing 65. Housing 65 is part of a temperature responsive system, identical to that disclosed in connection with FIG. 1. The mercury filled system reciprocates a plunger within housing 65 in accordance with the variations of temperature within tank 1. The motions of this reciprocating plunger are transmitted directly to temperature shaft 64. Shaft 64 is journaled through a bushing in block 66, bolted to base plate 50. Guided in this manner, temperature shaft 64 is urged upwardly by spring 67 and positioned downwardly by the expanding mercury conducted to housing 65. The result is the pivoting of rocker arm 59 about line-point 61 so that flat contact surface 62 will engage wedge 58 at the point which will fix the lower end of the straight-line path so its translation into barrels of oil will be net with respect to temperature.

The support for the shaft of rocker arm 59 is very solidly carried by support 70. Support 70 is a part of plate 71. Plate 71 is adjustably mounted on base plate 50, sliding transverse to the straight-line path of shaft 42 on plate guide 72. Plate guide 72 is bolted to base plate 50, and bolts 73, in slots transverse to the straight-line path of shaft 42, provide for lateral positioning of the pivot of rocker arm 59. As the gravity of the oil passed through tank 1 changes, its response to temperature variation changes. Therefore, the gravity variation may be described as the multiplying factor of the temperature factor as a compensation of the integrator. This varying multiplying factor is applied to the integration by shifting the pivot point of rocker arm 59 laterally with respect to the straight-line path of shaft 42.

Shifting of plate 71 is specifically accomplished by providing a block member 74 as a part of plate 71 and threading worm gear 75 through it from left side of plate 52. Knob 76 illustrates a means by which worm gear 75 may be manually adjusted to position plate 71. A calibrated scale 77 is also turned by worm gear 75 to serve as an index of introducing gravity as a multiplying factor of the temperature integrator compensation. Obviously, worm gear 75 can be automatically rotated from an instrument continuously responding to gravity change of the oil in tank 1.

On the upper end of the stroke of piston shaft 42, nut 54 is also shown as manually adjusted. FIG. 4 shows the structural arrangement with which this adjustment is made. Nut 54 is threaded onto a fixture 80. Fixture 80 is bolted to the underside of top mounting plate 53. Nut 54 is rotated in its threaded engagement to fixture 80 with worm gear 81. Worm gear 81 is journaled through abutment 82 which is a part of the top mounting plate 53. Knob 83, on worm gear 81, provides means through which manual adjustment of surface 55 will fix the upper limit of the stroke of piston shaft 42. This manual means for introducing the basic sediment and water content of the oil into the integration compensation is to be compared with the automatic adjustment of nut 24 in FIG. 1. In either event, adjustment of this upper limit of travel for the piston shaft is an accurate compensation of the length of straight-line path. In FIG. 1 this length is translated into net barrels of oil totaled by register 43.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombination. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What I claim and desire to secure by Letters Patent is:
1. A compensated integrator including,
 a piston arranged to reciprocate along a straight-line path,
 motive means including a cylinder arranged to reciprocate the piston along the straight-line path,
 a power supply consisting of a fluid pressure source applied to the cylinder alternately from opposite sides of the piston by a primary element responding to the delivery of each of a number of gross predetermined volumes of fluid to a point of use from a container to cause the piston to reciprocate along its straight-line path a number of times which is proportional to a gross number of predetermined volumes of fluid delivered,
 means including a counter actuated by the piston through a clutch applying the piston power to the counter as the piston moves in one of its two directions of movement in reciprocation for cumulating the number and length of piston reciprocations along the straight-line path as a measure of the gross number of predetermined volumes of fluid delivered to the point of use, a first stop member positioned axially along the straight-line path to establish one end of the travel of the piston along the straight-line path, a second stop member pivoted from a point positioned in accordance with the specific gravity of the fluid delivered from the container on a line extended laterally of the straight-line path into position in the straight-line path to establish the other end of the travel of the piston along the straight-line path, and means including a temperature responsive system exposed to the temperature of the fluid delivered from the container to pivot the second stop member into various positions along the straight-line path, whereby the length of the path over which the piston is reciprocated is proportional to the number of predetermined volumes of fluid delivered to the point of use at a predetermined temperature.

2. A compensated integrator including, a piston arranged to reciprocate along a straight-line path, motive means including a cylinder arranged to reciprocate the piston along the straight-line path, a power supply consisting of a fluid pressure source applied to the cylinder alternately from opposite sides of the piston by a primary element responding to the delivery of each of a number of gross predetermined volumes of oil to a point of use from a container to cause the piston to reciprocate along its straight-line path a number of times which is proportional to a gross number of predetermined volumes of oil delivered, means including a counter actuated by the piston through a clutch applying the piston power to the counter as the piston moves in one of its two directions of movement in reciprocation for cumulating the number and length of piston reciprocations along the straight-line path as a measure of the gross number of predetermined volumes of oil delivered to the point of use, a first stop member positioned axially along the straight-line path by a system responding to the basic sediment and water contact of the oil to establish one end of the travel of the piston along the straight-line path, a second stop member pivoted from a point positioned in accordance with the specific gravity of the oil delivered from the container on a line extended laterally of the straight-line path into position in the straight-line path to establish the other end of the travel of the piston along the straight-line path, and means including a temperature responsive system exposed to the temperature of the oil delivered from the container to pivot the second stop member into various positions along the straight-line path, whereby the length of the path over which the piston is reciprocated is proportional to the number of predetermined volumes of fluid delivered to the point of use at a predetermined temperature and a predetermined percent of basic sediment and water.

3. A compensated integrator of units of volume of a fluid metered including, a piston having a straight-line path along which it is reciprocated, a first stop member in the straight line path of the piston, motive means for reciprocating the piston along its path from the first stop member in coordination with the number of units of fluid volume metered, means for cumulating the number and length of piston reciprocations as a measure of the total units of fluid volume metered, a second stop member in the form of a lever pivoted from a point positioned on a line extended laterally of the piston path in accordance with the gravity of the fluid, and means responsive to temperature of the fluid units metered to pivot the lever into positions along the piston path, whereby the means for cumulating the piston reciprocations between the first and second stop members as a measure of the total units of fluid volume measure is compensated in proportion to the total units of fluid volume at the values the temperature assumes multiplied by the gravity to give high accuracy to the compensation of the measure of the total units of fluid volume.

4. In a lease automatic custody transfer system, a tank valved to receive and deliver saleable oil from a producing well to a point of use, level responsive means in the tank, a piston with a straight-line path along which it reciprocates from a position fixed at a first end of the path, fluid pressure motive means actuated by the level responsive means to reciprocate the piston a number of times proportional to the number of times the tank delivers its volume to the point of use, a lever pivoted into the piston path to fix the second end of the path to which the piston is moved by the motive means, means for shifting the pivot point of the lever along a line extended laterally of the straight-line path of the piston in accordance with gravity changes of the oil, means pivoting the lever in accordance with the temperature of the oil, whereby the length of the piston path is fixed proportional to the volume of oil at the values of the temperature and gravity, and means for cumulatively registering the path lengths as the total volume of saleable oil passed through the tank at predetermined values of the temperature and gravity.

5. In a lease automatic custody transfer system, a tank valved to receive and deliver saleable oil from a producing well to a point of use, level responsive means in the tank, a piston with a straight-line path along which it reciprocates from a position fixed at a first end of the path, means for adjusting the position at the first end of the path of the piston in accordance with the percent of basic sediment and water in the oil, fluid pressure motive means actuated by the level responsive means to reciprocate the piston a number of times proportional to the number of times the tank delivers its volume to the point of use, a lever pivoted into the piston path to fix the second end of the path to which the piston is moved by the motive means, means for shifting the pivot point of the lever along a line extended laterally of the straight-line path of the piston in accordance with gravity changes of the oil, means pivoting the lever in accordance with the temperature of the oil, whereby the length of the piston path is fixed proportional to the volume of oil at the values of the temperature and gravity and basic sediment and water, and means for cumulatively registering the path lengths as the total volume of saleable oil passed through the tank at predetermined values of the temperature and gravity and basic sediment and water.

References Cited in the file of this patent

UNITED STATES PATENTS

| | | |
|---|---|---|
| 844,958 | Riggs | Feb. 19, 1907 |
| 2,158,381 | Raymond | May 16, 1939 |
| 2,851,014 | Healy | Sept. 9, 1958 |
| 2,876,641 | Brown | Mar. 10, 1959 |